United States Patent
Yang

(10) Patent No.: US 8,363,761 B2
(45) Date of Patent: Jan. 29, 2013

(54) WIRELESS MODEM AND NOISE CANCELLATION METHOD FOR THE SAME

(75) Inventor: Dong Il Yang, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 254 days.

(21) Appl. No.: 12/781,911

(22) Filed: May 18, 2010

(65) Prior Publication Data

US 2010/0296561 A1  Nov. 25, 2010

(30) Foreign Application Priority Data

May 19, 2009  (KR) ........................ 10-2009-0043651

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/284; 375/285; 375/350; 375/229; 375/232; 455/570; 455/296; 455/302; 455/307

(58) Field of Classification Search ................. 375/346, 375/284, 285, 350, 229, 232, 222; 455/570, 455/296, 302, 307
See application file for complete search history.

(56) References Cited

FOREIGN PATENT DOCUMENTS

| JP | 2008-244987 | 10/2008 |
|----|-------------|---------|
| KR | 10-0856283  | 9/2008  |

*Primary Examiner* — Phuong Phu
(74) *Attorney, Agent, or Firm* — Cha & Reiter, LLC

(57) ABSTRACT

A wireless modem and noise cancellation method for the same for noise cancellation effectively cancels a noise signal induced from a device to which the wireless modem is connected. A primary antenna receives a radio signal that includes a first noise signal coming from a device to which the wireless modem is connected; a secondary antenna receives a second noise signal from the connected device; a noise signal adjuster for adjusting the second noise signal received by the secondary antenna using a correlation parameter between noise signals received by the primary antenna and the secondary antenna; and a noise remover subtracts the noise signal adjusted by the noise signal adjuster from the radio signal received by the primary antenna.

14 Claims, 13 Drawing Sheets

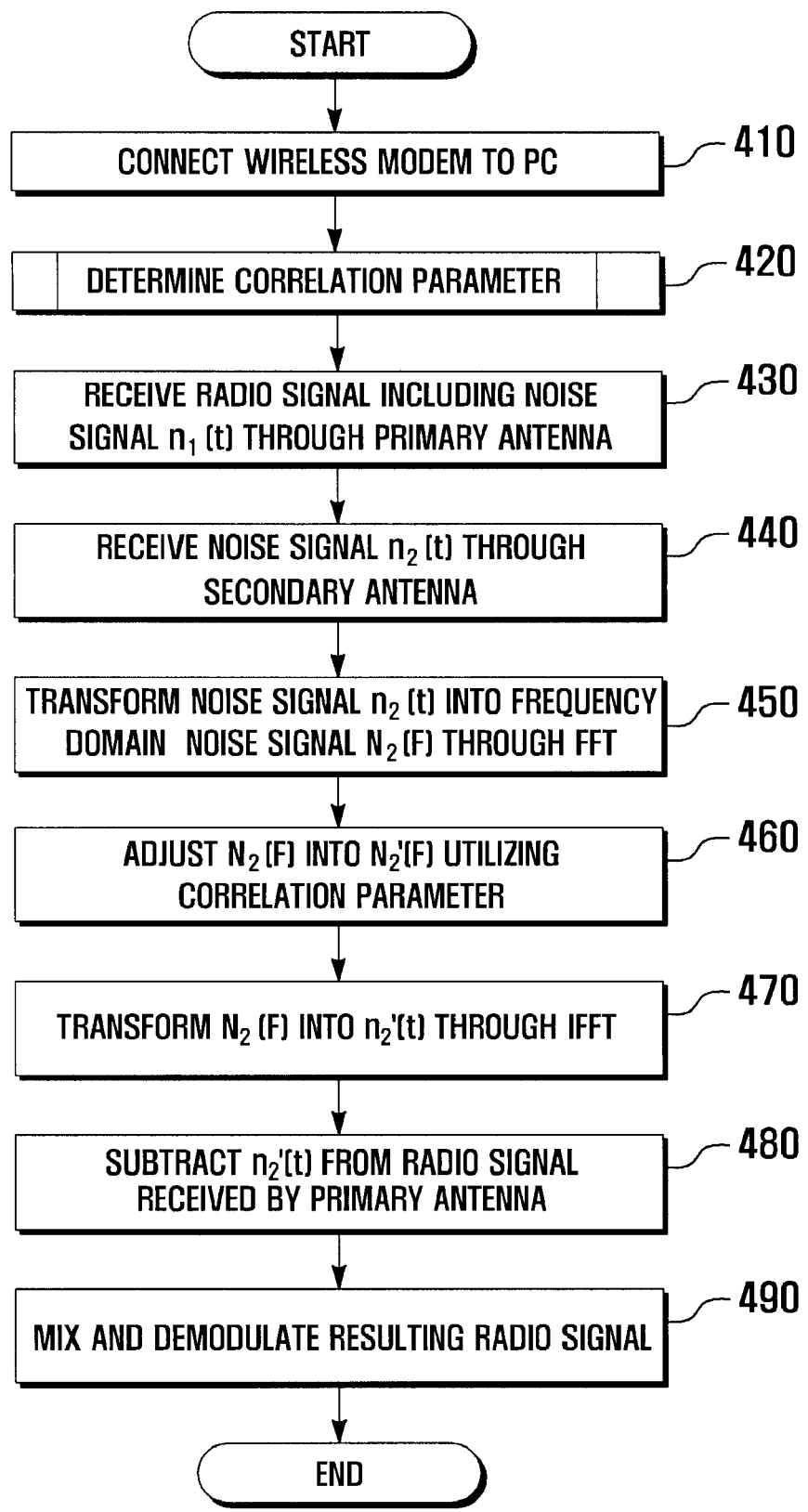

FIG. 9

| FREQUENCY (MHz) | AMPLITUDE (RELATIVE) | PHASE (DEGREE) |
|---|---|---|
| 869.34 | 0.8 | 3 |
| 869.44 | 0.9 | 12 |
| 869.54 | 1.1 | 15 |
| 869.64 | 0.8 | 3 |
| 869.74 | 0.9 | 12 |
| 869.84 | 1.1 | 15 |
| . . . . | . . . . | . . . . |

FIG. 10

| PC TYPE | SLOT LOCATION | ANGLE | FREQUENCY | AMPLITUDE | PHASE |
|---|---|---|---|---|---|
| Samsung sens Q320 | Slot #3 | 90° | 869.34 | 0.8 | 3 |
|  |  |  | 869.44 | 0.9 | 12 |
|  |  |  | . . . . . | . . . . . | . . . . . |
| Samsung sens X360 | Slot #11 | 150° | 869.34 | 0.9 | 12 |
|  |  |  | 869.44 | 1.1 | 15 |
|  |  |  | . . . . . | . . . . . | . . . . . |
| . . . |  |  |  |  |  |

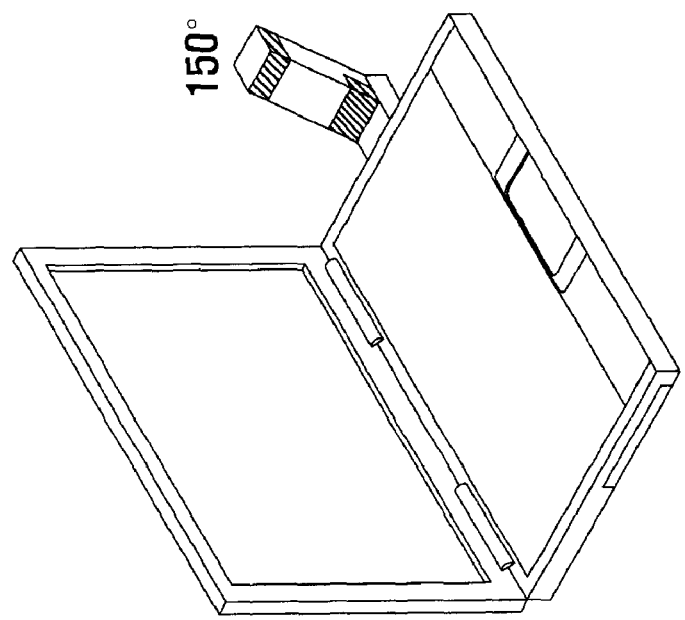
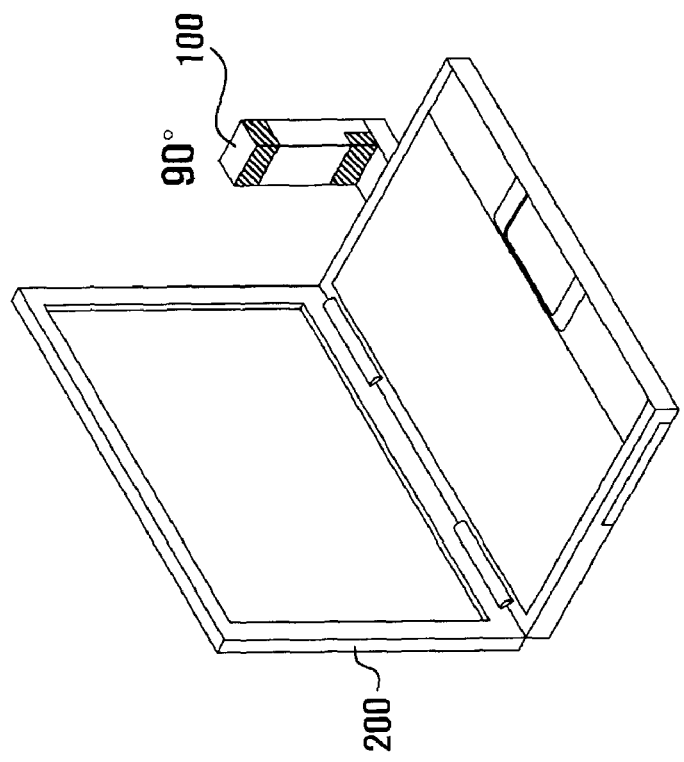

WIRELESS MODEM AND NOISE CANCELLATION METHOD FOR THE SAME

CLAIM OF PRIORITY

This application claims the benefit of priority from Korean Patent Application No. 10-2009-0043651 filed May 19, 2009, the contents of which are hereby incorporated by references in its entirety.

BACKGROUND OF THE INVENTION

1. Field of the Invention

The present invention relates generally to a wireless modem capable of noise cancellation. More particularly, the present invention to a noise cancellation method for suppressing noise generated from a device to which the wireless modem is connected.

2. Description of the Related Art

Thanks to advances in wireless communication technology, a personal computer (PC) is capable of performing wireless data communication through a built-in modem card, modem dongle, or an external modem. A typical wireless modem may be connected to a PC through a universal serial bus (USB).

In a case where wireless data communication is performed using a wireless modem plugged into a PC, as the distance between the wireless modem and the PC is very short, noise generated from the PC may be introduced to the antenna of the wireless modem, causing degradation of reception sensitivity for a data signal. In particular, when the wireless modem is placed in relatively low electric fields where electric field conditions are poor, the wireless modem may not receive a desired data signal owing to noise generated from the PC. The antenna gain may be heightened to enhance reception sensitivity. However, it may be difficult for an omni-directional antenna to increase reception sensitivity through antenna gain adjustment because both a data signal and noise are induced simultaneously, thus the noise is still sufficient to interfere with the desired data.

Hence, in order to enhance reception sensitivity of a wireless modem, there is a need to provide a noise suppression modem and method that suppresses noise generated from the device to which the wireless modem is connected, and is induced to the antenna of the wireless modem.

SUMMARY OF THE INVENTION

The present invention provides a wireless modem that for effectively canceling noise induced to the antenna.

The present invention also provides a method for effectively canceling noise induced to the antenna of a wireless modem.

In accordance with an exemplary embodiment of the present invention, there is provided a wireless modem with noise cancellation, including: a primary antenna for receiving a radio signal and a first noise signal coming from a device to which the wireless modem is connected; a secondary antenna for receiving second noise signal from the connected device; a noise signal adjuster unit for adjusting the second noise signal received by the secondary antenna, said noise signal adjuster unit utilizing a particular correlation parameter associated with the first and second noise signals received by the primary antenna and the secondary antenna; and a noise remover subtracting the second noise signal adjusted by the noise signal adjuster unit from the radio signal received by the primary antenna.

In addition the present invention preferably includes a primary antenna receiving a radio signal that preferably includes a noise signal coming from a device to which the wireless modem is connected; a secondary antenna for receiving a noise signal from the connected device; a noise signal adjuster adjusting the noise signal received by the secondary antenna using a correlation parameter between noise signals received by the primary antenna and the secondary antenna; and a noise remover subtracting the noise signal adjusted by the noise signal adjuster from the radio signal received by the primary antenna.

In accordance with another exemplary embodiment of the present invention, there is provided a noise cancellation method for a wireless modem, preferably including: determining a correlation parameter between a noise signal received by a primary antenna and a noise signal received by a secondary antenna; receiving, by the primary antenna, a radio signal that includes a noise signal coming from a device to which the wireless modem is connected; receiving, by the secondary antenna, a noise signal from the connected device; adjusting the noise signal received by the secondary antenna using the determined correlation parameter; and subtracting the adjusted noise signal from the radio signal received by the primary antenna.

According to an exemplary aspect of the present invention, a wireless modem capable of noise suppression is provided wherein induced noise from the device to which the wireless modem is connected can be effectively cancelled. Hence, data signal reception sensitivity of the wireless modem can be enhanced and the signal to noise ratio may be increased. Enhancement of reception sensitivity may increase the actual data transfer rate in the wireless data communication environment.

BRIEF DESCRIPTION OF THE DRAWINGS

The features and advantages of the present invention will be more apparent from the following detailed description in conjunction with the accompanying drawings, in which:

FIG. 4 is a flow chart of a noise cancellation method according to another exemplary embodiment of the present invention;

FIG. 9 is a table of correlation parameter values;

FIG. 10 is a table of correlation parameter values arranged according to information on personal computers;

FIGS. 12a and 12b illustrate different angles formed by the wireless modem and the personal computer.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

Figure 1:
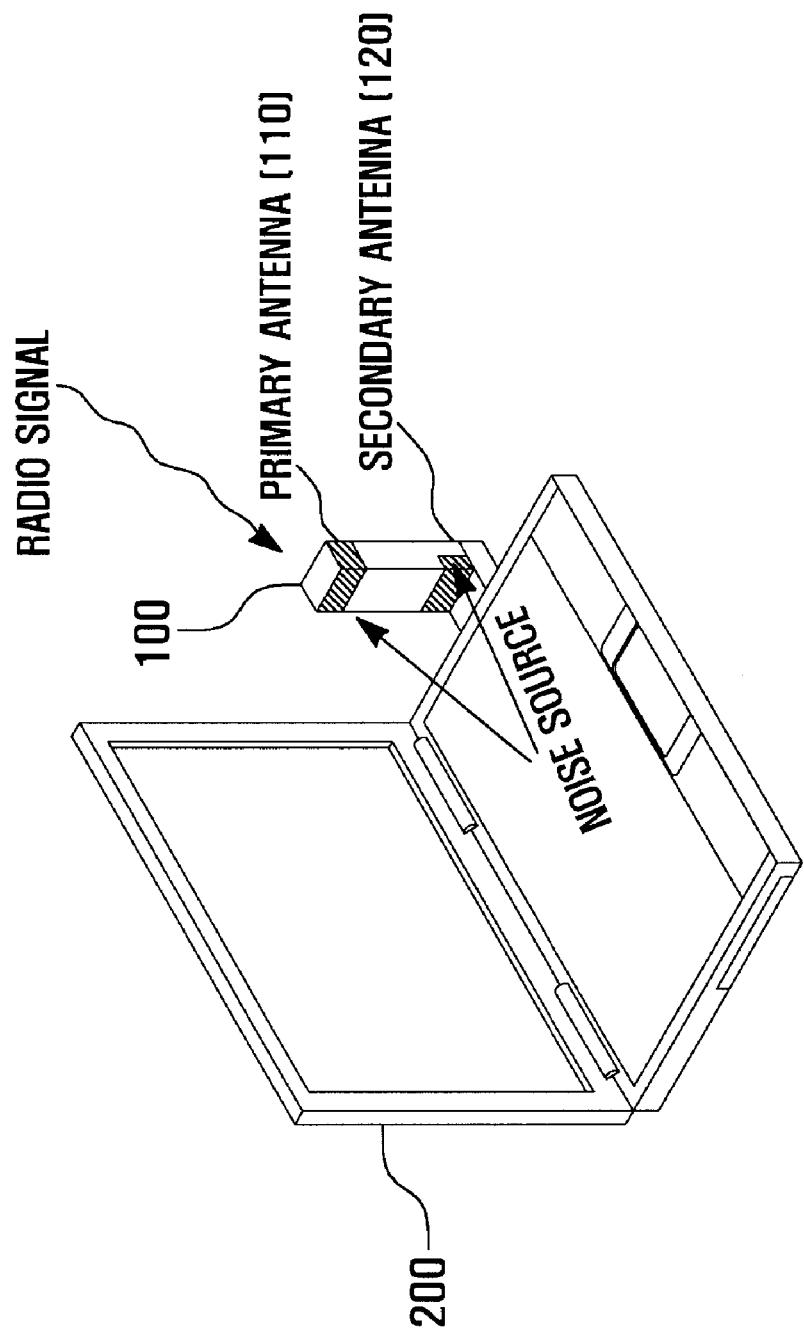
FIG. 1 illustrates a wireless modem and a personal computer to which the wireless modem is connected.

FIG. 1 illustrates a wireless modem 100 and a personal computer 200 to which the wireless modem is connected.

The wireless modem 100 is a modem that may be used to connect to a wireless network through a mobile communication network. The wireless modem 100 preferably enables data communication through a mobile communication network, such as a High Speed Downlink Packet Access (HSDPA) network, an Evolution Data Optimized (EV-DO) network, a Wideband Code Division Access (WCDMA) network, or a Wireless Broadband (Wibro) network. In particular, the wireless modem 100 includes a primary antenna 110 and a secondary antenna 120. The primary antenna 110 receives a radio signal from a corresponding base station (or a base transceiver station (BTS)). The wireless modem 100 is configured so that the primary antenna 110 is placed above the secondary antenna 120 when connected to the PC 200, and the PC is arranged in its normal operating position where the keypad is substantially horizontal. The primary antenna 110 may be arranged at the highest end of the wireless modem 100. The primary antenna 110 may receive not only a radio signal from the base station but also a noise signal from the PC 200. The secondary antenna 120 is designed so as to receive only a noise signal from the PC 200. The wireless modem 100 is further detailed in connection with FIG. 2.

The PC 200 preferably comprises a computer connectable to the wireless modem 100. When the wireless modem 100 is installed, the PC 200 controls the wireless modem 100 to receive a data signal from the base station. In this exemplary embodiment the device to which the wireless modem 100 is connectable is focused on a personal computer, such as a desktop computer, or a laptop computer. However, the present invention is not limited to the device comprising a personal computer, and may be applied to any device that is connectable to the wireless modem 100 for data communication including appliances, games, etc., just to name a few possibilities.

Figure 2:
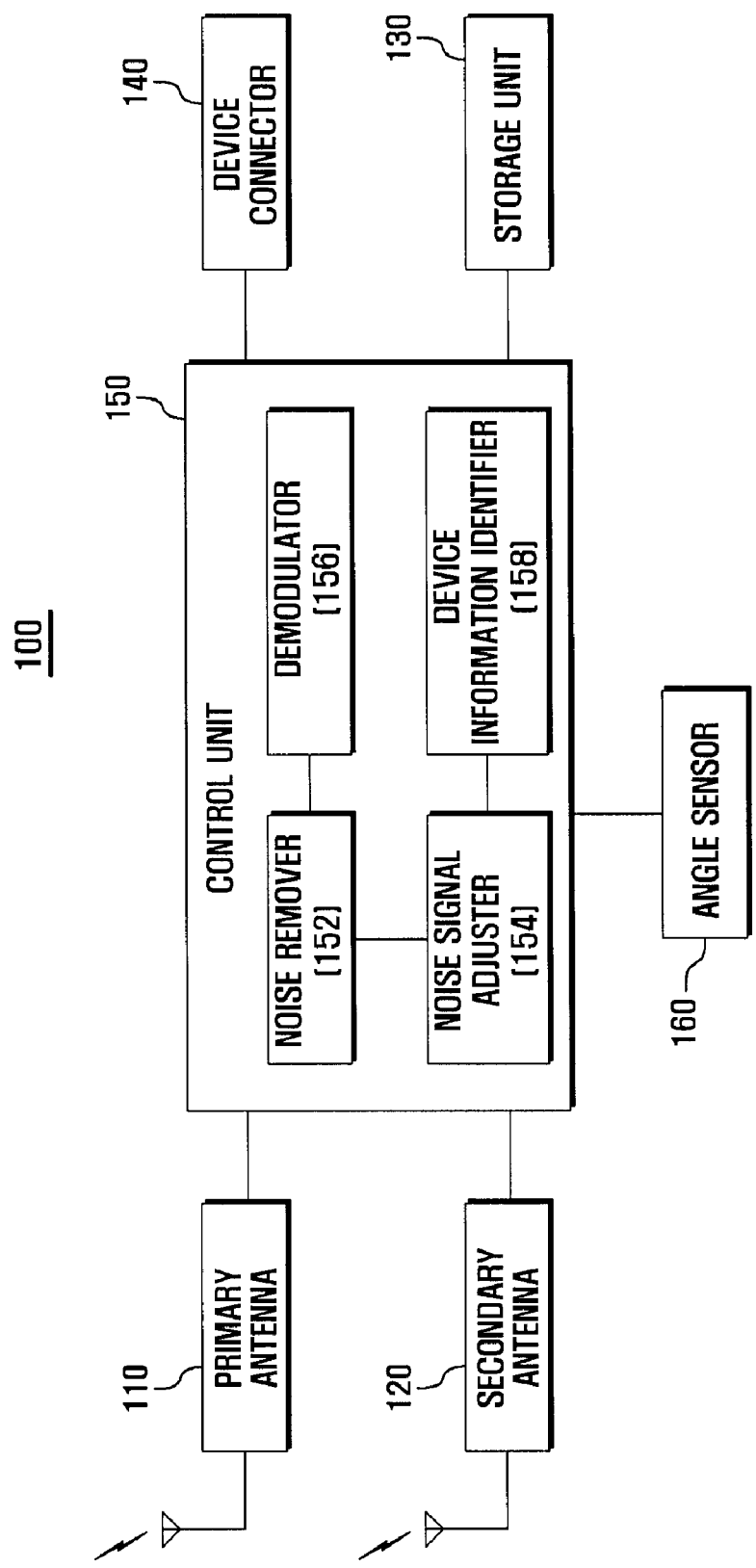
FIG. 2 is a block diagram of the wireless modem according to an exemplary embodiment of the present invention.

FIG. 2 is a block diagram of the wireless modem 100 according to an exemplary embodiment of the present invention.

Referring to FIG. 2, the wireless modem 100 preferably includes a primary antenna 110, a secondary antenna 120, a storage unit 130, a device connector 140, a control unit 150, and an angle sensor 160.

The primary antenna 110 preferably receives a data signal s(t) from a base station of a mobile communication network. The primary antenna 110 is designed to be positioned above the secondary antenna 120 when the wireless modem 100 is installed in the PC 200. The primary antenna 110 may also receive a noise signal n1(t) from the PC 200. The PC 200 may produce noise, which may be induced as a noise signal n1(t) to the primary antenna 110. Hence, the primary antenna 110 may receive a radio signal r1(t) composed of a data signal s(t) and a noise signal n1(t).

The secondary antenna 120 may receive a noise signal n2(t) from the PC 200. The PC 200 may produce the noise, which can be induced as the noise signal n2(t) to the secondary antenna 120. Hence, the signal r2(t) received by the secondary antenna 120 may be composed of a noise signal n2(t). The secondary antenna 120 is designed to handle wideband frequencies (that would include the noise) in comparison to the primary antenna 110. The secondary antenna 120 is arranged sufficiently close to the PC 200 so that the noise signal radiated by the PC 200 constitutes most of the noise received by the secondary antenna 120. It is possible to assume that the wireless modem 100 is located at a region with a low electric field so that the radio signal received by the secondary antenna 120 from a base station is negligible in comparison to a noise signal received from the PC 200.

With continued reference to FIG. 2, the storage unit 130 may store a program that removes a noise signal from the radio signal received by the primary antenna 110. The storage unit 130 may store a program that calibrates the noise signal n2(t) received by the secondary antenna 120 so that the noise signal n2(t) becomes identical to or similar in amplitude and phase to the noise signal n1(t) received by the primary antenna 110. The storage unit 130 preferably stores a table of correlation parameters for calibrating the noise signal n2(t). A correlation parameter value may be composed of an amplitude value and a phase value for a given frequency. The storage unit 130 may store multiple sets of correlation parameters, which may be classified on the basis of the computer model, the connection location of the wireless modem at the computer, and the angle formed by the computer and the wireless modem.

The device connector 140 provides an interface interconnecting the wireless modem 100 and the PC 200. The device connector 140 preferably comprises a USB interface, and may be any other type of interface means enabling interworking of the wireless modem 100 and the PC 200. When the wireless modem 100 is connected to the PC 200, the device connector 140 establishes a data path through which identification information regarding the model of the PC 200, the connection location of the wireless modem 100 at the PC 200 and the angle formed by the PC 200 and the wireless modem 100 is sent to a device information identifier 158 of the control unit 150.

The control unit 150 controls the overall operation of the wireless modem 100 and controls signal exchange between the internal blocks thereof. To achieve the control of the signal exchange, the control unit 150 may include a noise remover 152, a noise signal adjuster 154, a demodulator 156, and a device information identifier 158.

The noise remover 152 shown in FIG. 2 removes the first noise signal n1(t) from the radio signal r1(t) received by the primary antenna 110. The noise remover 152 subtracts the noise signal n2'(t), coming from the noise signal adjuster 154, from a data signal s(t), received by the primary antenna 110 from the base station, and a noise signal n1(t), received by the primary antenna 110 from the PC 200, and sends the resulting signal to the demodulator 156.

The noise signal adjuster 154 shown in FIG. 2 calibrates the second noise signal n2(t) received by the secondary antenna 120 into the noise signal n2'(t) by applying a correlation parameter to the noise signal n2(t). The noise signal adjuster 154 may compute the correlation parameter on the basis of wireless and noise signals from the primary antenna 110 and the secondary antenna 120, and may also extract the correlation parameter value from the information on the connected PC 200. The noise signal adjuster 154 may retrieve a desired one of correlation parameter values stored in the storage unit 130, and/or may also receive a correlation parameter value from a Web server.

The demodulator 156 mixes and demodulates a signal resulted from removal of the noise signal n2'(t) from the radio signal r1(t) received by the primary antenna 110. The demodulator 156 converts a radio frequency (RF) signal through a mixer (therein or in communication therewith) into an intermediate frequency (IF) signal, and the demodulator 156 extracts data carried by the data signal s(t) through demodulating the IF signal.

The device information identifier 158 recognizes information (as shown in FIG. 2) regarding the PC 200 to which the wireless modem 100 is connected. The device information identifier 158 may identify the model or type of the PC 200 and the connection location of the wireless modem 100 at the PC 200. Noise characteristics may vary according to the computer model, and noise signals received by the primary antenna 110 and the secondary antenna 120 may vary according to the location at which the wireless modem 100 is connected to the PC 200. Hence, the model of the PC 200 and the connection location of the wireless modem 100 at the PC 200 can be used a criterion for determining the correlation parameter. In addition, when the wireless modem 100 is installed in the PC 200, the device information identifier 158 may obtain information on the angle formed by the wireless modem 100 and the PC 200.

FIGS. 12a and 12b illustrate different angles formed by the wireless modem 100 and the PC 200. In FIG. 12a, the angle between the wireless modem 100 and the PC 200 is substantially 90 degrees. In FIG. 12b, the angle between the wireless modem 100 and the PC 200 is substantially 150 degrees. Noise signals received by the primary antenna 110 and the secondary antenna 120 may vary according to angles between the wireless modem 100 and the PC 200. Hence, the angle between the wireless modem 100 and the PC 200 may become a criterion for determining the correlation parameter for noise signals.

Now referring to FIG. 2 again, the angle sensor 160 senses a degree of the angle between the wireless modem 100 and the PC 200. When the wireless modem 100 has a swivel design, the angle sensor 160 can be included in the wireless modem 100. The angle sensor 160 may comprise an optical sensor, or may comprise a sensor sensing the rotation of the wireless modem 100 relative to the PC 200. The optical sensor may also sense the angle between the wireless modem 100 and the PC 200 by the use of reflected light. The angle sensor 160 may sense the angle by measuring the rotation of a joint structure coupling the wireless modem 100 with the PC 200.

When the noise signal adjuster 154 can directly compute the correlation parameter value on the basis of noise signals received by the primary antenna 110 and the secondary antenna 120 (as in the case of FIG. 3A), the device information identifier 158 and the angle sensor 160 can be excluded from the wireless modem 100.

Figure 3A:
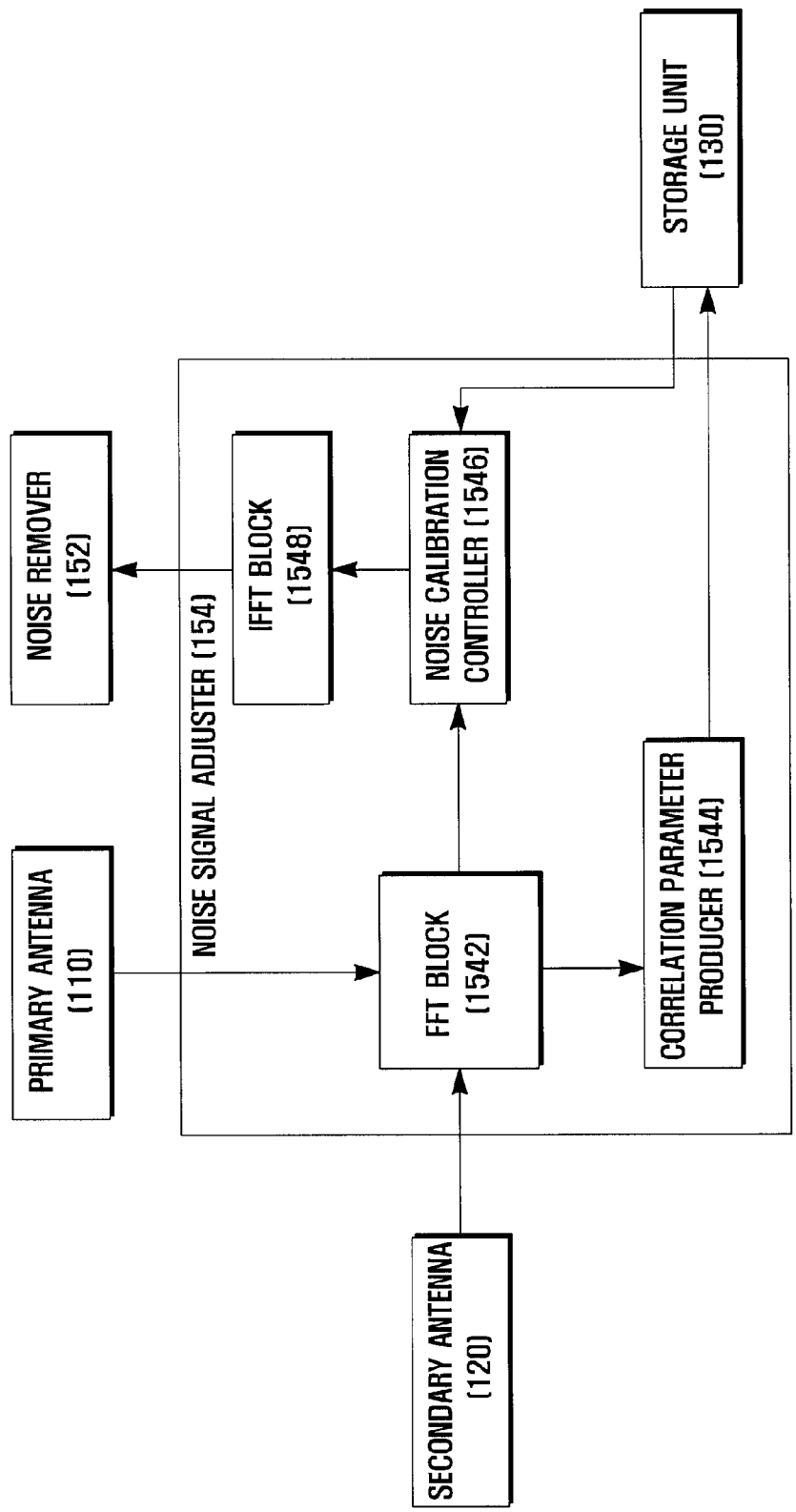
FIG. 3a illustrates a first example of a noise calibrator in the wireless modem.

FIG. 3a illustrates a first example of the noise signal adjuster 154 in the wireless modem 100.

Referring now to FIG. 3A, the noise signal adjuster 154 may include, for example, a Fast Fourier Transform (FFT) block 1542, a correlation parameter producer 1544, a noise calibration controller 1546, and an Inverse Fast Fourier Transform (IFFT) block 1548.

The FFT block 1542 transforms a time domain noise signal from the secondary antenna 120 into a frequency domain noise signal through FFT and sends the frequency domain noise signal to the noise calibration controller 1546. That is, the FFT block 1542 transforms noise signal "n2(t)" received by the secondary antenna 120 into "N2(f)", and sends N2(f) to the noise calibration controller 1546. In addition, the FFT block 1542 transforms a time domain radio signal from the primary antenna 110 into a frequency domain radio signal and transforms a time domain noise signal from the secondary antenna 120 into a frequency domain noise signal, and sends the frequency domain radio signal and the frequency domain noise signal to the correlation parameter producer 1544. That is, the FFT block 1542 transforms a data signal s(t) and a noise signal n1(t) received by the primary antenna 110 respectively into frequency domains S(f) and N1(f), transforms a noise signal n2(t) received by the secondary antenna 120 into N2(f), and sends S(f), N1(f) and N2(f) to the correlation parameter producer 1544.

With continued reference to FIG. 3a, the correlation parameter producer 1544 produces a correlation parameter on the basis of a frequency domain radio signal (R1(f)=S(f)+N1(f)) and a frequency domain noise signal N2(f) from the FFT block 1542. In an exemplary embodiment, the correlation parameter is defined preferably in terms of amplitudes of R1(f) and N2(f) and the phase difference between R1(f) and N2(f) according to frequencies. When the data signal S(f) is weak enough to be negligible in comparison to N2(f), the correlation parameter may be computed on the basis of amplitudes of N1(f) and N2(f) and the phase difference between N1(f) and N2(f) according to frequencies. The correlation parameter producer 1544 may produce the correlation parameter by comparing R1(f) with N2(f), or may produce the correlation parameter by comparing R1(f) to N2(f) with the exclusion of the frequencies corresponding to channels in service. The correlation parameter producer 1544 computes the correlation parameter between R1(f) and N2(f) utilizing Equation 1.

$$R1(f)/N2(f)=\text{Amp}(f)\exp(i*\text{phase}(f));\qquad\text{[Equation 1]}$$

wherein Amp(f) is the relative amplitude at frequency f and phase(f) is the phase difference at frequency f.

When the correlation parameter is computed with the exclusion of the frequencies corresponding to channels in service, the correlation parameter producer 1544 computes the correlation parameter using only a radio signal R1(f) having a frequency f not corresponding to a channel in service according to Equation 1. The amplitude and phase of a radio signal R1 at a frequency f corresponding to a channel in service may be replaced with the amplitude and phase at another frequency not corresponding to a channel in service. The correlation parameter producer 1544 preferably stores the computed correlation parameter in the storage unit 130. The correlation parameter producer 1544 may directly send the computed correlation parameter to the noise calibration controller 1546.

The noise calibration controller 1546 adjusts N2(f) from the FFT block 1542 utilizing the correlation parameter. The noise calibration controller 1546 may directly receive the correlation parameter from the correlation parameter producer 1544, or may retrieve the correlation parameter from the storage unit 130. The noise calibration controller 1546 adjusts N2(f) into N2'(f) using Equation 2.

$$N2'(f)=\text{Amp}(f)\exp(i*\text{phase}(f))N2(f)\qquad\text{[Equation 2]}$$

The IFFT block 1548 transforms an adjusted frequency domain noise signal N2'(f) from the noise calibration controller 1546 into a time domain noise signal n2'(t) through IFFT, and sends the time domain noise signal n2'(t) to the noise remover 152.

Figure 3B:
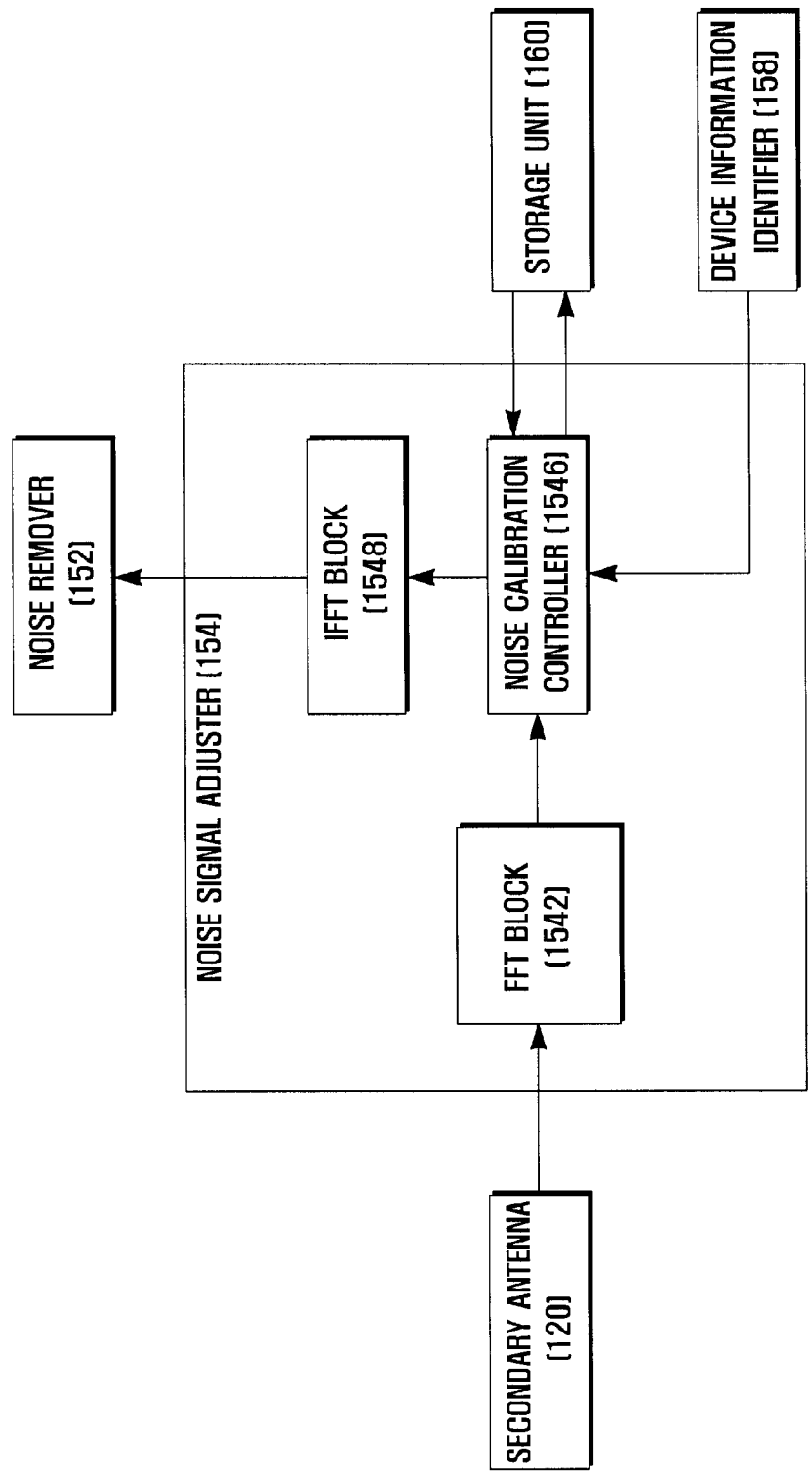
FIG. 3b illustrates a second example of the noise calibrator.

FIG. 3b illustrates a second example of the noise signal adjuster 154 in the control unit of wireless modem 100.

Referring now to FIG. 3b, the noise signal adjuster 154 may include an FFT block 1542, a noise calibration controller 1546, and an IFFT block 1548.

The FFT block 1542 transforms time domain noise signal "n2(t)" from the secondary antenna 120 into frequency domain noise signal "N2(f)" through FFT and sends the frequency domain noise signal N2(f) to the noise calibration controller 1546.

The noise calibration controller 1546 adjusts N2(f) from the FFT block 1542 utilizing the correlation parameter. The noise calibration controller 1546 receives information regarding the connected PC 200 from the device information identifier 158 (shown in FIG. 2). The information regarding the PC 200 may include the model of the PC 200, serial number, the connection location of the wireless modem 100 at the PC 200, and the angle between the wireless modem 100 and the PC 200. The noise calibration controller 1546 may read the correlation parameter value, corresponding to the information regarding the PC 200 from the device information identifier 158, from the storage unit 130. The noise calibration controller 1546 may also receive the correlation parameter value, corresponding to the information regarding the PC 200, from a Web server through the primary antenna 110. The noise calibration controller 1546 adjusts a noise signal N2(f) from the FFT block 1542 into a noise signal N2'(f) using Equation 2.

The IFFT block 1548 transforms an adjusted frequency domain noise signal N2'(f) from the noise calibration controller 1546 into a time domain noise signal n2'(t) through IFFT, and sends the time domain noise signal n2'(t) to the noise remover 152.

FIG. 4 is a flow chart of a noise cancellation method according to another exemplary embodiment of the present invention.

Referring now to FIG. 4, at step (410) the wireless modem 100 is connected to the PC 200 through the device connector 140 and the control unit 150 is aware of the connection therebetween. At step (420), the control unit 150 determines the correlation parameter value. Example procedures for determining the correlation parameter are described in connection with FIGS. 5 to 8.

After determining the correlation parameter value, at step (430) the primary antenna 110 receives a radio signal r1(t) that is composed of a data signal s(t) from a base station and a noise signal n1(t) from the PC 200, and sends the received radio signal r1(t) to the noise remover 152 under control of the control unit 150. At step (440), the control unit 150 controls the secondary antenna 120 to receive a noise signal n2(t) from the PC 200. Steps 430 and 440 may be performed simultaneously or sequentially in any order. The noise signal n1(t) and noise signal n2(t) are generated by the same noise source (the PC 200) and are received respectively by the primary antenna 110 and the secondary antenna 120.

With continued reference to FIG. 4, at step (450), the FFT block 1542 transforms the time domain noise signal n2(t) into a frequency domain noise signal N2(f) through FFT and sends N2(f) to the noise calibration controller 1546. The noise calibration controller 1546 adjusts N2(f) from the FFT block 1542 into N2'(f) utilizing the correlation parameter through Equation 2, at step (460) and sends N2'(f) to the IFFT block 1548.

At step (470), the IFFT block 1548 transforms N2'(f) into n2'(t) through IFFT, and sends n2'(t) to the noise remover 152. The noise remover 152 subtracts n2'(t), coming from the IFFT block 1548, from the radio signal (r1(t)=s(t)+n1(t)), coming from the primary antenna 110, and at step (480) sends the remaining signal to the demodulator 156. As n2(t) is adjusted into n2'(t) using the correlation parameter reflecting the relationship between n1(t) and n2(t), n2'(t) may become a noise signal identical to or close in terms of amplitude and phase to n1(t). If n2'(t) becomes identical to n1(t), the noise remover 152 may completely remove n1(t) from r1(t), in which case only s(t) may remain. At step (490), the demodulator 156 converts the signal from the noise remover 152 through a mixer into an IF signal and extracts data carried by the data signal by demodulating the IF signal.

As described above, a correlation parameter is determined between a noise signal n1(t) and a noise signal n2(t); the noise signal n1(t) is predicted by applying the correlation parameter to the noise signal n2(t) received by the secondary antenna 120; and the predicted noise signal n1(t) is subtracted from a radio signal r1(t) received by the primary antenna 110. Hence, the noise signal induced to the primary antenna 110 may be effectively removed.

Figure 5:
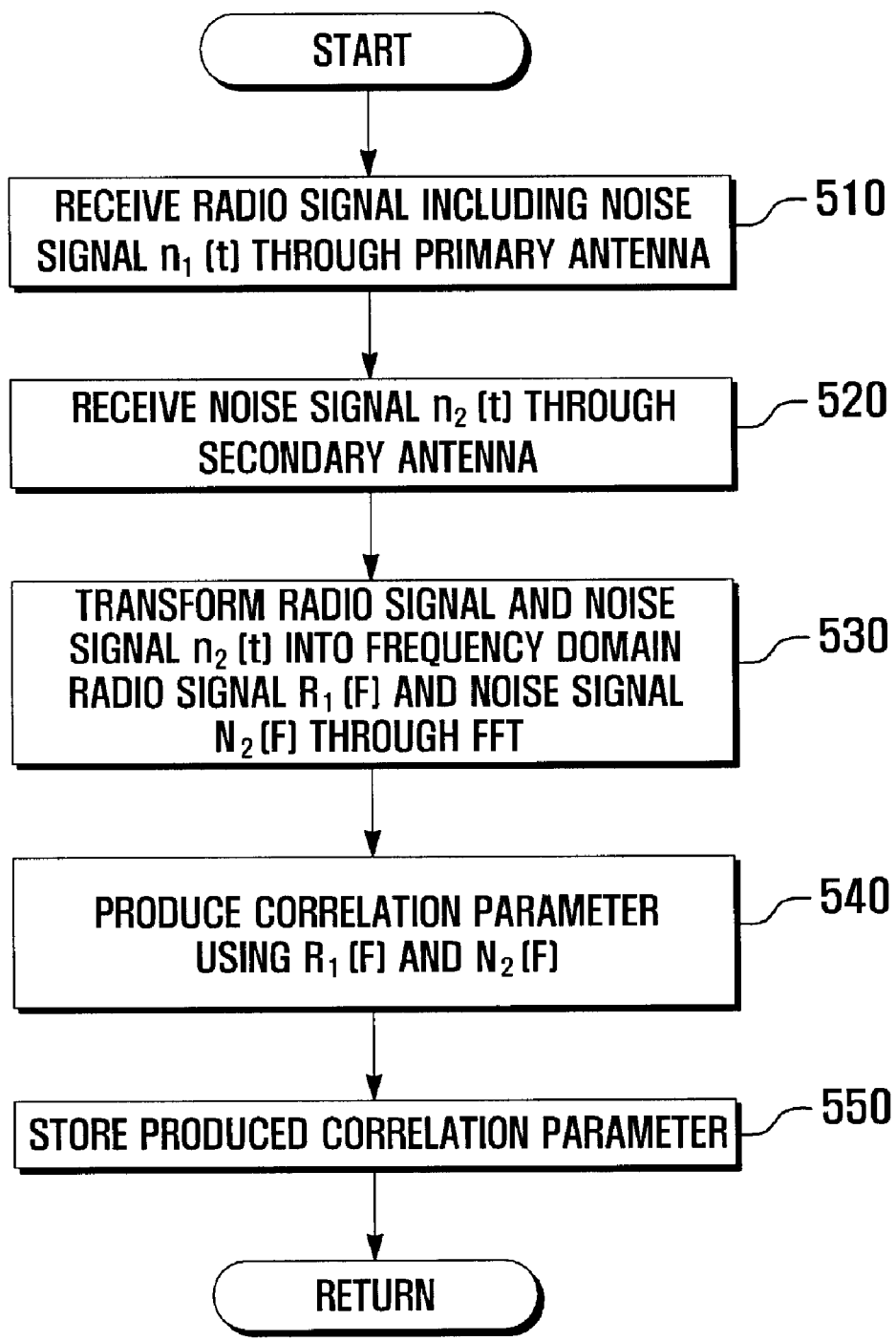
FIG. 5 is a flow chart of a procedure implementing the step for setting a correlation parameter in the method of FIG. 4.

FIG. 5 is a flow chart of a procedure implementing the step for setting a correlation parameter (step 420) in FIG. 4.

Referring now to FIG. 5, at step (510) the control unit 150 controls the primary antenna 110 to receive a radio signal r1(t) composed of a data signal s(t) and a noise signal n1(t), and to send the received radio signal r1(t) to the FFT block 1542. At step (520), the control unit 150 controls the secondary antenna 120 to receive a noise signal n2(t) and to send the received noise signal n2(t) to the FFT block 1542. Herein, steps 510 and step 520 may be performed simultaneously or sequentially in any order. The FFT block 1542 at step (530) transforms the radio signal r1(t) into a frequency domain signal R1(f), transforms the noise signal n2(t) into a frequency domain signal N2(f), and sends R1(f) and N2(f) to the correlation parameter producer 1544.

At step (540), the correlation parameter producer 1544 produces a correlation parameter by comparing the amplitude and phase of R1(f) with the amplitude and phase of N2(f) at a given frequency and using Equation 1. Sampling frequencies are selected from the whole relevant frequency band. At a selected sampling frequency, the correlation parameter producer 1544 obtains the amplitudes of R1(f) and N2(f) and the phase difference between R1(f) and N2(f). FIG. 9 is a table of correlation parameter values. In FIG. 9, the sampling frequency starts at 869.34 MHz and increases in increments of 0.1 MHz. At each sampling frequency, the amplitudes of R1(f) and N2(f) and the phase difference between R1(f) and N2(f) are obtained and the correlation parameter is computed using Equation 1. Here, the increment for sampling frequencies may be greater than or less than 0.1 MHz.

At step (550), the correlation parameter producer 1544 stores the computed correlation parameter in the storage unit 130. The correlation parameter producer 1544 may directly send the computed correlation parameter to the noise calibration controller 1546.

Figure 6:
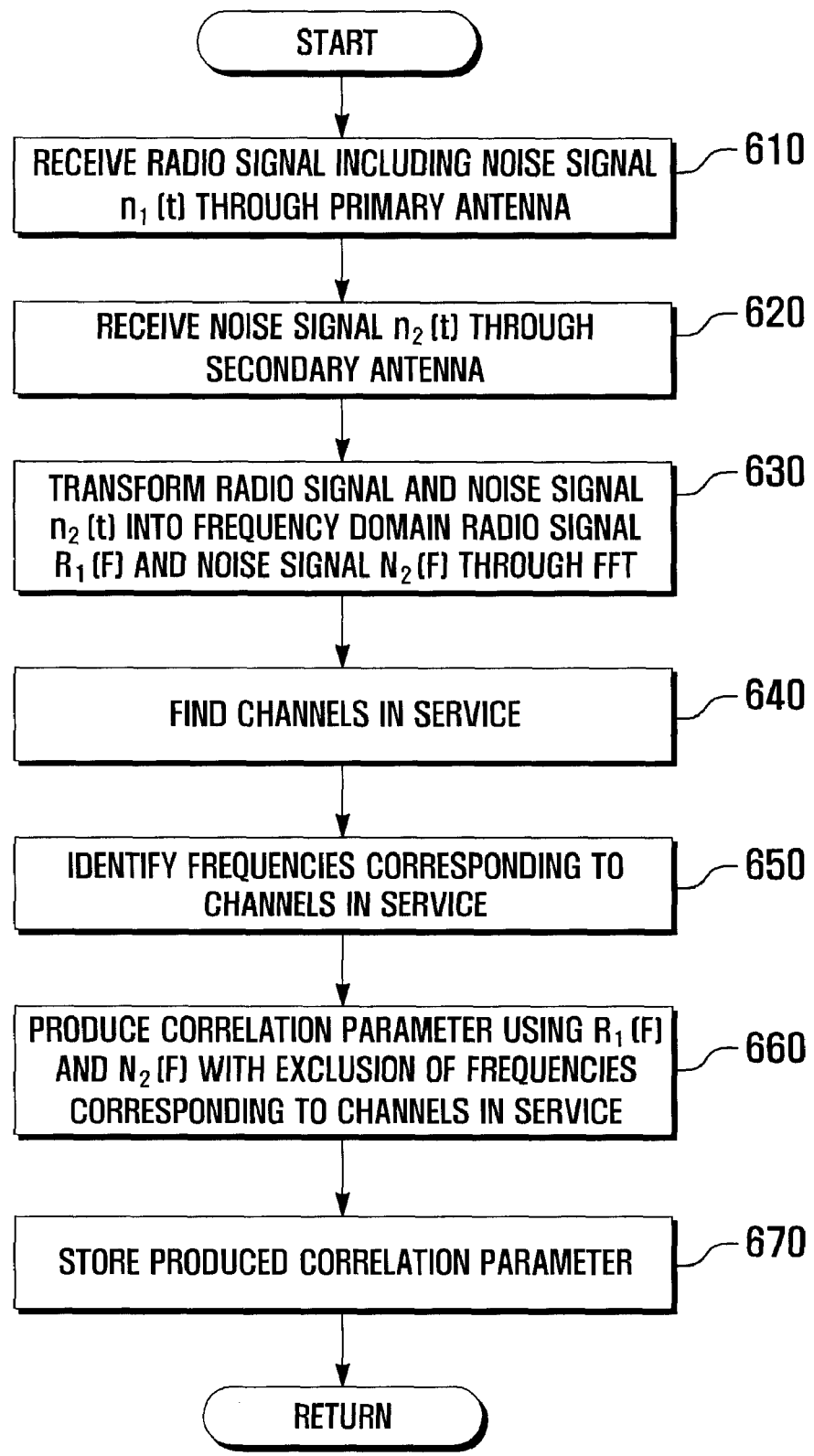
FIG. 6 is a flow chart of another procedure implementing the step for setting a correlation parameter in the method of FIG. 4.

FIG. 6 is a flow chart of another procedure implementing the step for setting a correlation parameter (step 420) in FIG. 4.

Referring now to FIG. 6, at step (610), the control unit 150 controls the primary antenna 110 to receive a radio signal r1(t) composed of a data signal s(t) and a noise signal n1(t), and to send the received radio signal r1(t) to the FFT block 1542. At step (620), the control unit 150 controls the secondary antenna 120 to receive a noise signal n2(t) and to send the received noise signal n2(t) to the FFT block 1542. Here, step 610 and step 620 may be performed simultaneously or sequentially in any order.

At step (630), the FFT block 1542 transforms the radio signal r1(t) into a frequency domain signal R1(f), transforms the noise signal n2(t) into a frequency domain signal N2(f), and sends R1(f) and N2(f) to the correlation parameter producer 1544.

Figure 11:
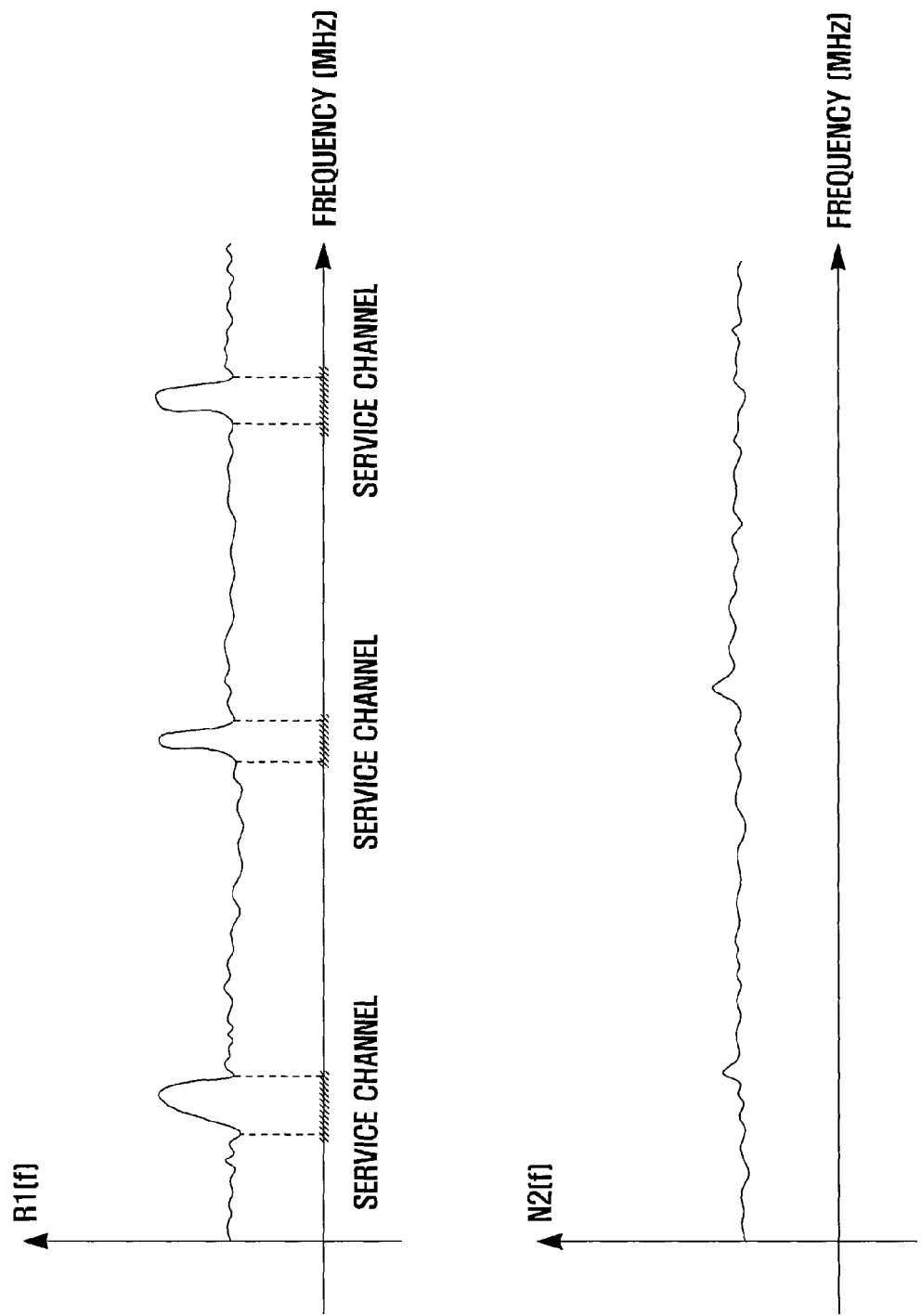
FIG. 11 depicts a radio signal received by a primary antenna and a noise signal received by a secondary antenna.

At step (640), the correlation parameter producer 1544 scans the entire frequency band of R1(f) to find a channel in service. FIG. 11 depicts a frequency domain radio signal R1(f) received by the primary antenna 110 and a frequency domain noise signal N2(f) received by the secondary antenna 120. As the primary antenna 110 receives a data signal s(t) from a base station in addition to a noise signal, R1(f) may include frequencies corresponding to channels in service and frequencies not corresponding to channels in service.

After scanning R1(f), at step (650) the correlation parameter producer 1544 identifies frequencies corresponding to channels in service in the process of determining the correlation parameter. Those frequencies corresponding to channels in service may carry a data signal, and may cause an error in computing the correlation parameter between noise signals. Hence, the correlation parameter producer 1544 utilizes only frequencies not corresponding to channels in service in the process of determining the correlation parameter, excluding those frequencies corresponding to channels in service.

At step (660), the correlation parameter producer 1544 computes the correlation parameter by comparing the amplitude and phase of R1(f) with the amplitude and phase of N2(f) at a given frequency and using Equation 1 with the exclusion of the frequencies corresponding to channels in service according to Equation 1. Sampling frequencies are selected from the whole relevant frequency band with the exclusion of the frequencies corresponding to channels in service. At a selected sampling frequency, the correlation parameter producer 1544 obtains the amplitudes of R1(f) and N2(f) and the phase difference between R1(f) and N2(f). The correlation parameter producer 1544 may replace the amplitude and phase at a frequency band corresponding to a channel in service with the amplitude and phase at another frequency band not corresponding to a channel in service.

At step (670), the correlation parameter producer 1544 stores the computed correlation parameter in the storage unit 130. The correlation parameter producer 1544 may directly send the computed correlation parameter to the noise calibration controller 1546. In the case of FIG. 6, as described above, channels in service are found by scanning the entire relevant frequency band, and the correlation parameter is computed with the exclusion of frequencies corresponding to channels in service. Hence, the correlation parameter may be determined more accurately.

Figure 7:
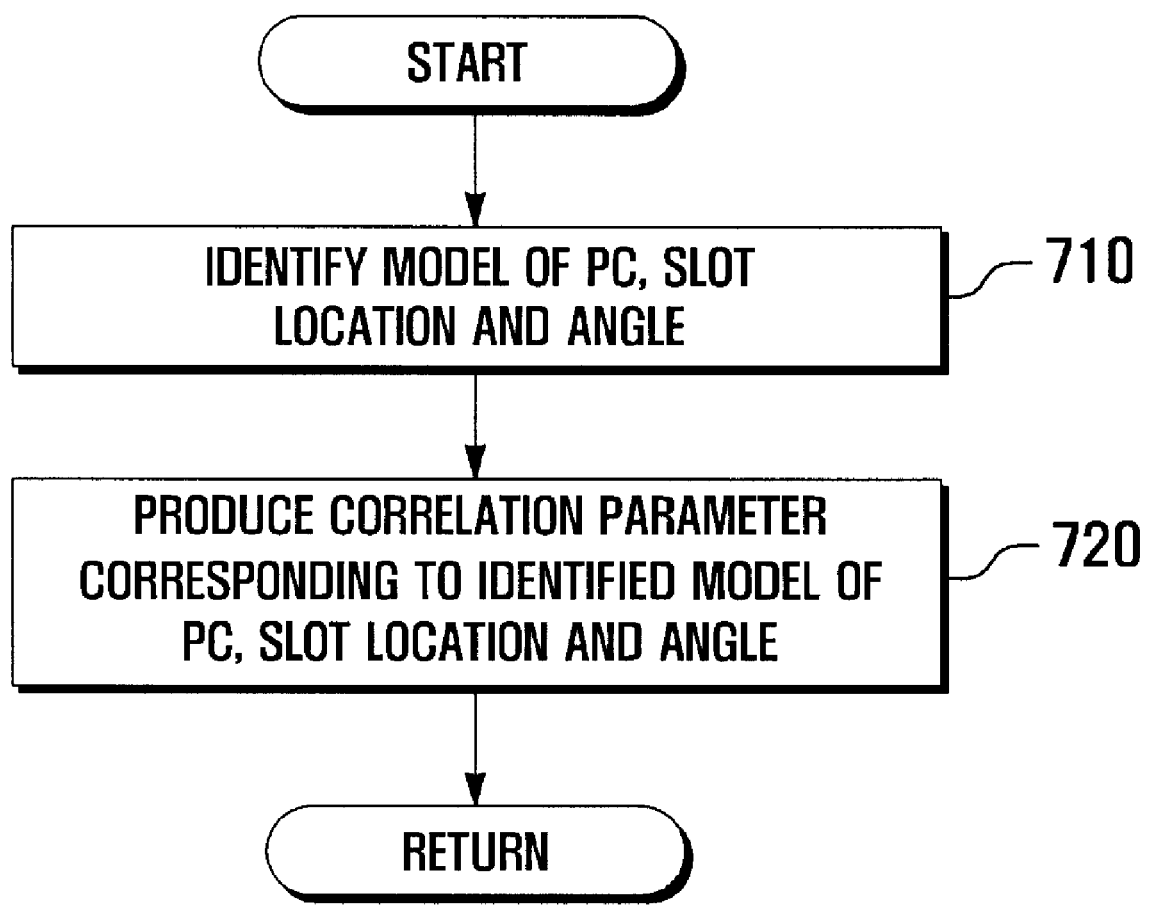
FIG. 7 is a flow chart of another procedure implementing the step for setting a correlation parameter in the method of FIG. 4.

FIG. 7 is a flow chart of another exemplary procedure implementing the step for setting a correlation parameter (step 420) in FIG. 4. In FIG. 7, it is assumed that the correlation parameter is given in advance according to the particular model of the PC 200, the connection location of the wireless modem 100 at the PC 200, and the angle between the wireless modem 100 and the PC 200.

Correlation parameter values are produced in a state where the PC 200 and the wireless modem 100 are present in a shielded room. As the shielded room provides insulation from external radio signals, the primary antenna 110 and the secondary antenna 120 may receive only a noise signal coming from the PC 200. For a given frequency, the strength of a signal sent from the noise remover 152 to the demodulator 156 is measured, and the correlation parameter is set using the amplitude and phase that minimize the strength of the signal. Alternatively, while varying the connection location of the wireless modem 100 at the PC 200 and the angle between the wireless modem 100 and the PC 200, the strength of a signal sent from the noise remover 152 to the demodulator 156 is measured, and the correlation parameter is set using the amplitude and phase that minimize the strength of the signal. FIG. 10 illustrates an exemplary table of correlation parameter values arranged according to information on personal computers. In FIG. 10, the amplitudes and phases are set according to frequencies, the computer model, the location of the slot at which the wireless modem 100 is connected to the computer, and the angle between the wireless modem 100 and the computer. In an exemplary embodiment, the correlation parameter may be set according to one or two of the computer models, the location of the slot at which the wireless modem 100 is connected to the computer, and the angle between the wireless modem 100 and the computer.

Referring again to FIG. 7, at step (710) the device information identifier 158 identifies information regarding the model of the PC 200, the location of the slot at which the wireless modem 100 is connected, and the angle between the wireless modem 100 and the PC 200, and sends the identified information to the noise calibration controller 1546. The device information identifier 158 obtains information regarding the model of the PC 200 and the location of the slot from the device connector 140, and obtains information from the angle sensor 160 regarding the angle between the wireless modem 100 and the PC 200.

The noise calibration controller 1546 retrieves the correlation parameter value from the storage unit 130 according to the identified information regarding the model of the PC 200, the location of the slot and the angle between the wireless modem 100 and the PC 200.

Figure 8:
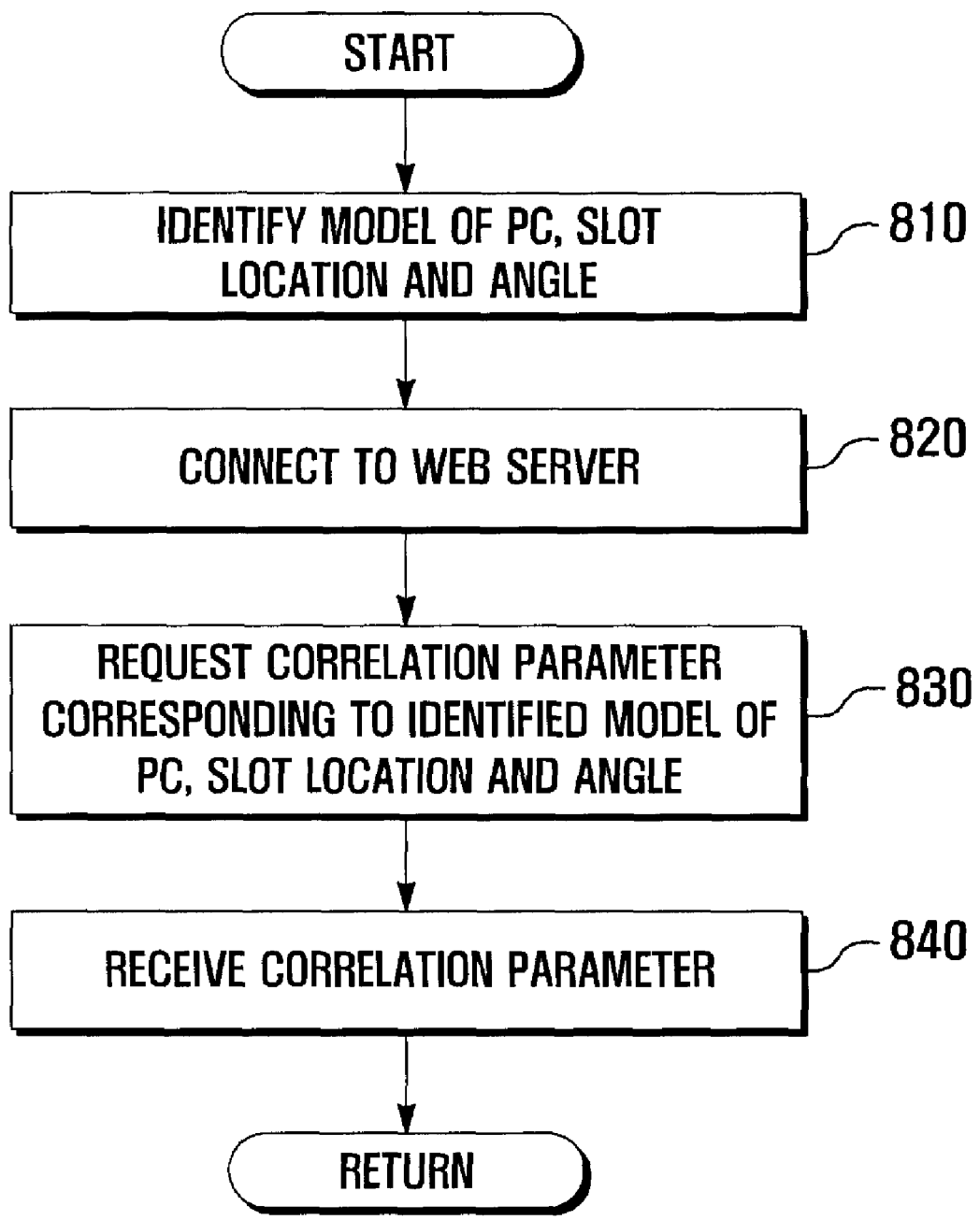
FIG. 8 is a flow chart of another procedure implementing the step for setting a correlation parameter in the method of FIG. 4.

FIG. 8 is a flow chart of another exemplary procedure implementing the step for setting a correlation parameter (step 420) in FIG. 4.

Referring now to FIG. 8, at step (810) the device information identifier 158 identifies information regarding the model of the PC 200, the location of the slot at which the wireless modem 100 is connected, and the angle between the wireless modem 100 and the PC 200. The device information identifier 158 obtains information regarding the model of the PC 200 and the location of the slot, and obtains information regarding the angle between the wireless modem 100 and the PC 200 from the angle sensor 160.

At step (820), the control unit 150 controls the primary antenna 110 to connect to a given Web server.

At step (830), the control unit 150 sends a request message to the Web server containing the identified device information for a correlation parameter value(830). Upon reception of the request message, the Web server retrieves the correlation parameter value corresponding to the device information from a correlation parameter database and sends the retrieved correlation parameter value to the wireless modem 100. At step (840), the control unit 150 controls the primary antenna 110 to receive the correlation parameter value from the Web server.

In the case of FIGS. 7 and 9, correlation parameter values are maintained by the wireless modem 100 or a Web server. A correlation parameter value corresponding to the information on the connected computer is extracted; a noise signal received by the secondary antenna 120 is adjusted using the extracted correlation parameter; and the adjusted noise signal is subtracted from a radio signal received by the primary antenna 110. Hence, the noise signal received by the primary antenna 110 can be effectively removed.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A wireless modem for providing noise cancellation, said wireless modem comprising:
    a primary antenna for receiving a radio signal and a first noise signal coming from a particular device to which the wireless modem is connected for communication therewith;
    a secondary antenna for receiving a second noise signal from the connected device;
    a noise signal adjuster unit for adjusting the second noise signal received by the secondary antenna, said noise signal adjuster unit utilizing a particular correlation parameter associated with the first and second noise signals received by the primary antenna and the secondary antenna; and
    a noise remover subtracting the second noise signal adjusted by the noise signal adjuster unit from the radio signal received by the primary antenna;
    wherein the noise signal adjuster comprises:
    a Fast Fourier Transform (FFT) block transforming unit for transforming a time domain radio signal and a time domain noise signal respectively into a frequency domain radio signal and a frequency domain noise signal;
    a correlation parameter producer for producing a correlation parameter by comparing the radio signal received by the primary antenna with the second noise signal received by the secondary antenna;
    a noise calibration controller for adjusting the second noise signal received by the secondary antenna using the produced correlation parameter; and
    an Inverse Fast Fourier Transform (IFFT) block transforming unit for transforming a frequency domain radio signal and a frequency domain noise signal respectively into a time domain radio signal and a time domain noise signal.

2. The wireless modem of claim 1, further comprising a storage unit that stores one or more correlation parameter values corresponding to respective individual devices in which the wireless modem can be coupled for communication therewith.

3. The wireless modem of claim 2, wherein the noise signal adjuster comprises:
    a Fast Fourier Transform (FFT) for block transforming a time domain radio signal and a time domain noise signal respectively into a frequency domain radio signal and a frequency domain noise signal;
    a device information identifier for identifying information regarding the particular device connected to the wireless modem;
    a noise calibration controller for retrieving a correlation parameter from said one or more correlation parameter values that corresponds to the particular identified device information from the storage unit, and for adjusting the second noise signal received by the secondary antenna using the retrieved correlation parameter; and
    an Inverse Fast Fourier Transform (IFFT) block for transforming a frequency domain radio signal and a frequency domain noise signal respectively into a time domain radio signal and a time domain noise signal.

4. The wireless modem of claim 3, wherein the device information identifier identifies a type of the device connected to the wireless modem and a location of connection.

5. The wireless modem of claim 3, further comprising an angle sensor that senses an angle between a position of the wireless modem and the particular device when the wireless modem is connected to the device.

6. The wireless modem of claim 5, wherein the device information identifier identifies information regarding the angle between the position of the wireless modem and the particular device.

7. The wireless modem of claim 1, wherein the correlation parameter producer produces correlation parameters by comparing an amplitude and phase of the radio signal received by the primary antenna with the amplitude and phase of the second noise signal received by the secondary antenna at a given frequency.

8. The wireless modem of claim 1, wherein the correlation parameter producer produces correlation parameters by comparing an amplitude and a phase of a radio signal received by the primary antenna with the amplitude and phase of the second noise signal received by the secondary antenna at a given frequency to the exclusion of frequencies corresponding to channels in service.

9. The wireless modem of claim 1, wherein, when the wireless modem is connected to the particular device, the distance between the secondary antenna and the particular device is shorter than a distance between the primary antenna and the particular device.

10. A noise cancellation method for a wireless modem, comprising:
    determining a correlation parameter between a first noise signal received by a primary antenna and a second noise signal received by a secondary antenna;
    receiving a radio signal by the primary antenna that includes the first noise signal coming from a particular device to which the wireless modem is connected for communication therewith; receiving the second noise signal from the connected device by the secondary antenna;
    adjusting the second noise signal received by the secondary antenna using the determined correlation parameter; and
    subtracting the adjusted noise signal from the radio signal received by the primary antenna;
    wherein determining a correlation parameter comprises:
    receiving a radio signal by the primary antenna, and receiving the secondary noise signal by the secondary antenna; and
    producing a correlation parameter by comparing the amplitude and phase of the radio signal received by the primary antenna with the amplitude and phase of the second noise signal received by the secondary antenna at a given frequency.

11. A noise cancellation method for a wireless modem, comprising:
   determining a correlation parameter between a first noise signal received by a primary antenna and a second noise signal received by a secondary antenna;
   receiving a radio signal by the primary antenna that includes the first noise signal coming from a particular device to which the wireless modem is connected for communication therewith; receiving the second noise signal from the connected device by the secondary antenna,
   adjusting the second noise signal received by the secondary antenna using the determined correlation parameter; and
   subtracting the adjusted noise signal from the radio signal received by the primary antenna, wherein determining a correlation parameter comprises:
   receiving a radio signal by the primary antenna, and receiving the second noise signal by the secondary antenna;
   identifying frequencies of the radio signal received by the primary antenna corresponding to channels in service; and
   producing a correlation parameter by comparing the amplitude and phase of the radio signal received by the primary antenna with the amplitude and phase of the second noise signal received by the secondary antenna at a given frequency to the exclusion of the frequencies corresponding to channels in service.

12. The noise cancellation method of claim 10, wherein determining a correlation parameter comprises:
   identifying information regarding the particular device connected to the wireless modem; and
   producing a correlation parameter using a stored value corresponding to the identified device information.

13. The noise cancellation method of claim 12, wherein identifying information regarding the particular connected device comprises identifying the type of the device and the location of connection.

14. A noise cancellation method for a wireless modem, comprising:
   determining a correlation parameter between a first noise signal received by a primary antenna and a second noise signal received by a secondary antenna;
   receiving a radio signal by the primary antenna that includes the first noise signal coming from a particular device to which the wireless modem is connected for communication therewith; receiving the second noise signal from the connected device by the secondary antenna;
   adjusting the second noise signal received by the secondary antenna using the determined correlation parameter; and
   subtracting the adjusted noise signal from the radio signal received by the primary antenna, wherein determining a correlation parameter comprises:
   identifying information regarding the particular device connected to the wireless modem; and producing a correlation parameter using a stored value corresponding to the identified device information,
   wherein identifying information regarding the particular connected device comprises identifying a connection angle between the wireless modem and the particular connected device.

* * * * *